Aug. 1, 1944.    C. F. SCHORN    2,355,014
ICE DETECTOR
Filed March 21, 1942
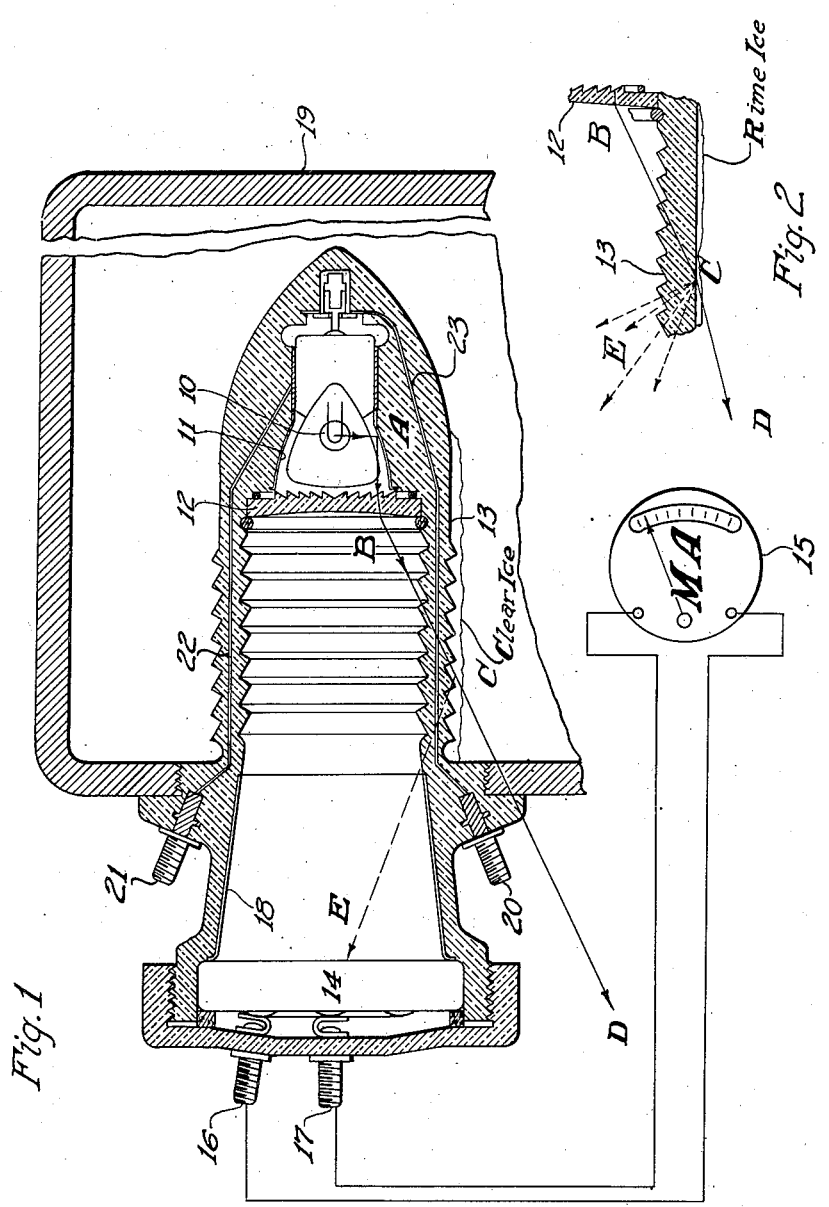
Carl F. Schorn
INVENTOR.
BY Patented Aug. 1, 1944

2,355,014

UNITED STATES PATENT OFFICE 2,355,014

ICE DETECTOR

Carl F. Schorn, Detroit, Mich.

Application March 21, 1942, Serial No. 435,611

1 Claim. (Cl. 177—311)

The object of this invention is to detect the presence of ice anywhere and specifically in an air passage of an airplane carburetor, and it is intended to be located at the danger point in what is commonly known as the adapter of an airplane engine on the engine side of the throttle. The problem is to warn the pilot that a dangerous amount of ice has accumulated in this adapter early enough so that he may move the controls to admit warm air so as to avoid a crash. The applicant's device is intended to give such a warning, but it is also adapted to operate a device to control the valve admitting the warm air to the air entrance or release an alcohol spray at a point beyond the throttle to counteract the formation of ice and to assist in removing the ice after it has commenced to form.

In the drawing:

Fig. 1 shows the preferred form of my invention.

Fig. 2 shows a slight modification of the detecting element.

In Fig. 1, 10 indicates a source of light, preferably electricity; 11 indicates a parabolic mirror; 12 indicates a lens cut as shown in order to disperse the rays of light laterally through walls 13 which are made of a plastic material having a cylindrical shape, which is adapted to permit light to pass through with very little distortion, for the reason that the effect of the reflector 11 and the method by which the lens 12 is cut is to disperse the light rays ABCD through the transparent wall 13 almost undistorted by the walls of the cylinder 13, because the rays fall normally on the serrations of the walls. 19 indicates an air entrance or carburetor "adapter" in which the ice detector is located. This adapter is preferably located on the engine side of the carburetor.

When ice forms on the outer surface of the cylinder 13, the light ray is refracted by clear ice and reflected by rime ice, and follows the path ABCE of Figs. 1 and 2. The light rays E strike a photoelectric cell 14 and generate a small current of electricity therein which is indicated on a milliammeter 15, which is connected to the terminals 16 and 17 of the photoelectric cell 14. Electricity is supplied to the electric light bulb 10, through the terminals 20 and 21 by means of conductors 22, 23 embedded in the cylinder 13.

The presence of ice is thus immediately detected on the indicator 15 because only when ice is formed do light rays reach the photoelectric cell 14. The reading on the indicator 15 gives an indication of the strength of the light falling onto the cell 14, and therefore indicates to a certain degree the amount of ice on the outer walls of the serrated plastic material. A shield 18 prevents light from outside the adapter 19 from striking the cell 14. The inner surface of the shield 18 is polished so as to act as a reflector to shunt stray light rays to the cell; particularly when the modification shown in Fig. 2 is adopted as it is adapted to detect the formation of rime ice.

This Fig. 2 shows a smooth outer surface to the element 13 and is particularly sensitive to the accumulation of rime ice. Fig. 1 is more adapted to respond to the formation of clear ice. A combination of both surfaces can, of course, be incorporated in one device.

What I claim is:

An ice detecting device comprising a cylindrical transparent chamber, a source of light within said chamber, means for diverting said light so that the light rays normally escape through the walls of said chamber, a photoelectric cell located in said chamber and so located that light rays diverted by ice formed on the outer walls of said transparent chamber are diverted onto said photoelectric cell.

CARL F. SCHORN.